2,700,058
Patented Jan. 18, 1955

2,700,058

PURIFICATION OF A CRUDE C₁₄ ALDEHYDE

Richard Pasternack, Islip, and Abraham Bavley, Brooklyn, N. Y., assignors to Chas. Pfizer & Co., Inc., a corporation of Delaware No Drawing. Application January 19, 1950,
Serial No. 139,534

4 Claims. (Cl. 260—598)

The present invention relates to the synthesis of vitamin A, more particularly to the purification of one of the intermediates in this synthesis.

It has been previously suggested to synthesize vitamin A from β-ionone and haloacetic esters to produce a 14-carbon aldehyde which is purified and then converted to vitamin A. Some of these suggestions are reported as follows: an article by Heilbron in the Journal of the Chemical Society (1942) beginning at page 725; an article by Ishikawa in the Chemische Zentralblatt (1937), section II, beginning at page 3452; U. S. Patent 2,369,161; U. S. Patent 2,412,465; U. S. Patent 2,451,740.

In each case, however, the $C_{14}$ aldehyde is purified by fractional distillation. This is a tedious process requiring special equipment for effecting the distillation in each step as rapidly as possible, and at as low a temperature as possible, to minimize the decomposition of the desired aldehyde. This aldehyde is sensitive to high temperatures and its purification has invariably resulted in large losses.

The chemical structure of the desired aldehyde is not clear, some of the workers reporting it as:

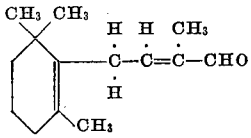

while others report it is:

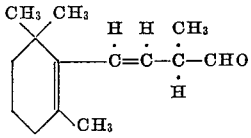

For the purposes of the present invention, the intermediate accordingly will be referred to as the $C_{14}$ aldehyde.

Among the objects of the present invention is an improved technique for preparing a vitamin A intermediate in purified form suitable for direct use, without further purification, in the synthesis of vitamin A.

A more specific object of the present invention is an improved method of purifying the $C_{14}$ aldehyde vitamin A intermediate which method avoids the disadvantages of the prior art methods.

The above as well as additional objects of the invention will be more readily understood from the description that follows.

According to the present invention the crude $C_{14}$ aldehyde as prepared is purified by crystallizing it from a hydrocarbon type solvent having a boiling range within the limits of from about 20 to about 110 degrees centigrade. By hydrocarbon type solvent is meant one that consists essentially of one or more saturated or unsaturated hydrocarbons of the aliphatic, alicyclic or aromatic classes, and whose freezing point is such that it will not itself crystallize at the operating temperatures used. Examples of highly effective solvents are petroleum distillates and methyl cyclohexane. Highly satisfactory crystallization of the purified intermediate from solution in the solvent, takes place at temperatures of about minus 30 degrees centigrade or lower. Sometimes the cooled solution should be seeded with some previously prepared crystals to accelerate the crystallization.

The $C_{14}$ aldehyde can be prepared by any of the methods described in the above-cited art. The crude reaction product may then be flash-distilled once to separate it out in crude form having a purity of about 50% or more. This crude aldehyde is then crystallized in accordance with the invention. One crystallization and a wash with cold solvent is sufficient to bring its purity to about 95% or higher. This material can be directly used without further purification for conversion to vitamin A. Where the crude material started with is below 50% in purity, two or more crystallizations may be desirable.

To enable those skilled in the art to more readily practice the invention, but without limiting its scope in any way, there are given below two examples illustrative of the invention.

Example I

Flash-distilled "$C_{14}$ aldehyde" (200 grams) made in the manner described in U. S. Patent No. 2,451,740 and assaying 90.2% spectrophotometrically, was stirred in a three-necked, one liter flask with 300 ml. of Skellysolve A (a commercially available standard petroleum fraction boiling at 28–38° C., prepared by Skelly Oil Company). The flask is fittted with a sealed stirrer which may be operated under vacuum. In the other necks of the flack were placed a thermometer and a glass tube fitted with a sintered-glass filter disk which may be moved down below the surface of the liquid. Stirring was started and the mixture was cooled by means of a Dry Ice-ethanol bath. When the temperature of the mixture dropped below minus 40° C., it was seeded with crystals from a previous batch and stirring was continued at the low temperature for one-half hour. The crystalline mass became quite thick and the stirring was stopped. Vacuum was applied to the glass tube bearing the filter disk and the mother liquid was drawn off away from the crystalline product and into a receiver. After most (about 300 ml.) of the solvent had been removed, 300 ml. of Skellysolve A, precooled to —50°, was added to the mixture in the flask. The stirring was again started and after another one half hour a second bath of solvent was similarly drawn off from the cold mixture. The remainder of the solvent was removed from the white product by applying a vacuum to the flask and gently warming. The "$C_{14}$ aldehyde" (159 grams) remaining assayed 97%. From the mother liquor there was obtained a further 41 grams of material of lower purity. Thus, the recrystallization resulted in an 86% recovery of material having 97% purity and suitable for the next step in the synthesis of vitamin A.

Example II

A sample of "$C_{14}$ aldehyde" (140 g.) of 66% purity, as determined spectrophotometrically, was stirred in the same type apparatus used above. Skellysolve A (210 ml.) was added and the stirred mixture was cooled to —50° C. The purified crystalline product separated and, after stirring one-half hour, as much of the motor liquor as possible was removed by suction. A 210 ml. portion of Skellysolve A at —50° C. was added, the mixture was stirred at —50° C. for one-half hour and most of the mother liquor was removed. The remainder of the solvent was removed by subjecting the product to a vacuum while warming it gently in a water bath. The solvent-free material weighed 82 g. and assayed 96% by the spectrophotometric method.

Similar results are produced when methyl cyclohexane or other hydrocarbons or mixtures that boil in the above-recited range is substituted for the Skellysolve A.

The spectrophotometric assays were determinations of the ultra-violet absorption at a wave length of 230 millimicrons (2300 Angstroms), using a Beckman Model DU spectrophotometer, and a standard reference sample of the $C_{14}$ aldehyde which had been purified by careful distillation and repeated recrystallization and which as a 1% solution in 95% ethanol had an absorption of $$E_{1\ cm.}^{1\%} = 85.2$$

The crystalline $C_{14}$ aldehyde as produced has a melting point of 1 to 2° centigrade and at normal or room temperatures is a yellow oil.

A feature of the invention is the fact that not only is the number and the temperature of the purification steps decreased but the crystallization, washing and drying of the $C_{14}$ aldehyde can be effected in a single container. This avoids transfer operations that may result in loss of expensive intermediate by its clinging to the surfaces of transfer apparatus, accidental spilling or other loss, etc. Furthermore, the next step in the vitamin A synthesis can also be effected by reacting the $C_{14}$ aldehyde in this same container after the wash solvent has been removed as by evaporation, or displaced by other fluids, if the crystallizing and/or wash solvent interferes with the subsequent treatment.

Thus for example the purified $C_{14}$ aldehyde remaining in the purification continues before or after evaporation of the residual hydrocarbon solvent, can be dissolved in ethyl ether by passing into the container an amount of ether which makes a solution having a concentration suitable for use in the next step in the preparations of vitamin A compounds as shown for example in Isler U. S. Patent No. 2,451,735 granted October 19, 1948. This ether solution is then added to a separately prepared ethyl ether solution of the magnesium bromide complex of 1-methoxy-3-methyl-pentene-2-yne-4, as described in the Isler patent.

Another feature of the invention is that substantially all of the $C_{14}$ aldehyde that is carried off in the mother liquors, can be recovered and purified as by one or more separate recrystallizations at higher concentrations. If desired the impure material recovered from the mother liquors may also be flash-distilled once to bring its purity up to about 50% or more, after which it can be recrystallized as above. The losses incident to the purification technique of the invention, are accordingly very minor.

As many apparently widely different embodiments of this invention may be made without departing from the spirit and scope hereof, it is to be understood that the invention is not limited to the specific embodiments hereby except as defined in the appended claims.

What is claimed is:

1. A process for the purification of crude $C_{14}$ aldehyde, which is a 14-carbon vitamin A intermediate derived from beta-ionone and an haloacetic ester, which comprises dissolving the crude $C_{14}$ aldehyde in a hydrocarbon solvent selected from the group consisting of petroleum distillates having a boiling range between about 28° and about 38° C., and methylcyclohexane, lowering the temperature of the solution to at least about —30° C., and recovering the $C_{14}$ aldehyde crystals so produced.

2. A process according to claim 1 in which the hydrocarbon solvent is a petroleum distillate boiling at substantially between 28 and 38° C., and in which the temperature of the solution is lowered to about —50° C.

3. A process for preparing a vitamin A intermediate which comprises dissolving, in a hydrocarbon solvent selected from the group consisting of petroleum distillates having a boiling range substantially between about 28° and 38° C. and methyl-cyclohexane, a crude $C_{14}$ aldehyde obtained by reacting beta-ionone with an haloacetic ester, treating the resulting ester to recover a product containing the 14-carbon aldehyde, and then flash distilling the resulting product to separate out the aldehyde in a crude form having a purity of at least about 50 percent, lowering the temperature of the hydrocarbon solution to below —30° C. to crystallize out the aldehyde in purified form, removing the substantially greater part of the mother liquor from the resulting mixture, washing the residue with a fresh quantity of chilled hydrocarbon solvent, having a boiling range between about 28° and 38° C., and removing the final solvent mixture.

4. A process according to claim 3 in which after the solution is lowered to below —30° C., it is seeded with a quantity of the aldehyde in crystalline form.

References Cited in the file of this patent
UNITED STATES PATENTS

| | | |
|---|---|---|
| 2,451,740 | Lindlar | Oct. 19, 1948 |
| 2,552,908 | Robeson | May 15, 1951 |

OTHER REFERENCES

Norris: "Experimental Organic Chemistry," McGraw-Hill Book Co., New York, 1933, pp. 3–8.

Isler: Chimia, May 1950, page 109.